(12) United States Patent
Zhao et al.

(10) Patent No.: US 12,333,223 B2
(45) Date of Patent: Jun. 17, 2025

(54) METHOD FOR DESIGNING STRONG COLUMN AND WEAK BEAM OF STEEL FRAME BEAM-BOX COLUMN UNDER BIDIRECTIONAL EARTHQUAKE ACTIONS

(71) Applicant: SOUTH CHINA UNIVERSITY OF TECHNOLOGY, Guangzhou (CN)

(72) Inventors: Junxian Zhao, Guangzhou (CN); Jiaxi Guo, Guangzhou (CN); Lijian Yan, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/789,721

(22) Filed: Jul. 31, 2024

(65) Prior Publication Data

US 2025/0086351 A1 Mar. 13, 2025

Related U.S. Application Data

(63) Continuation of application No. PCT/CN2023/128636, filed on Oct. 31, 2023.

(30) Foreign Application Priority Data

Sep. 8, 2023 (CN) .......................... 202311154828.8

(51) Int. Cl.
*G06F 30/20* (2020.01)
*G06F 30/13* (2020.01)
(Continued)

(52) U.S. Cl.
CPC .............. *G06F 30/20* (2020.01); *G06F 30/13* (2020.01); *G06F 2119/02* (2020.01); *G06F 2119/14* (2020.01)

(58) Field of Classification Search
CPC ...... G06F 30/20; G06F 30/13; G06F 2119/14; G06F 2119/02; G06F 30/25; G06F 30/27;
(Continued)

(56) References Cited

U.S. PATENT DOCUMENTS

2020/0040564 A1* 2/2020 Wu .......................... E04B 1/21

FOREIGN PATENT DOCUMENTS

| CN | 104929260 | 9/2015 |
|---|---|---|
| CN | 105160055 | 12/2015 |

(Continued)

OTHER PUBLICATIONS

Y. G. Zhao, T. Ono, K. Yoshihara, "An Investigation on Column over-design factors avoiding weak story Mechanisms of Steel Structures", pp. 1-7, (Year: 2004).*

(Continued)

*Primary Examiner* — Kibrom K Gebresilassie
(74) *Attorney, Agent, or Firm* — JCIPRNET

(57) ABSTRACT

The present invention provides a method for designing a strong column and weak beam of a steel frame beam-box column under bidirectional earthquake actions, including the following steps: designing an initial frame; defining important beam-column joints and important sections at a designed axial compression ratio according to a calculated result of a response spectrum CQC method of the initial frame; unifying bidirectional COF values of the important beam-column joints; determining a degree to achieve the strong column and weak beam and proposing two quantifiable evaluation indexes P1 and P2; performing statistics on a damage index D of the frame after an elastic-plastic time-history analysis of a plurality of selected groups of natural waves, and acquiring a parameter frame meeting a target yield mechanism via the statistics performed on the damage index D in combination with an evaluation standard provided by the present invention.

10 Claims, 9 Drawing Sheets

(51) Int. Cl.
*G06F 119/02* (2020.01)
*G06F 119/14* (2020.01)

(58) Field of Classification Search
CPC ... G06F 30/28; G06F 2111/00; G06F 2119/22
See application file for complete search history.

(56) References Cited

FOREIGN PATENT DOCUMENTS

| | | |
|---|---|---|
| CN | 109635476 | 4/2019 |
| CN | 115408741 | 11/2022 |
| CN | 116257981 | 6/2023 |
| JP | 2006291698 | 10/2006 |
| KR | 20230041309 | 3/2023 |

OTHER PUBLICATIONS

"International Search Report (Form PCT/ISA/210) of PCT/CN2023/128636," mailed on May 9, 2024, pp. 1-4.
"Written Opinion of the International Searching Authority (Form PCT/ISA/237) of PCT/CN2023/128636," mailed on May 9, 2024, with English translation thereof, pp. 1-10.

\* cited by examiner

METHOD FOR DESIGNING STRONG COLUMN AND WEAK BEAM OF STEEL FRAME BEAM-BOX COLUMN UNDER BIDIRECTIONAL EARTHQUAKE ACTIONS

CROSS-REFERENCE TO RELATED APPLICATION

This application is a continuation of international application of PCT application serial no. PCT/CN2023/128636, filed on Oct. 31, 2023, which claims the priority benefit of China application no. 202311154828.8, filed on Sep. 8, 2023. The entirety of each of the above-mentioned patent applications is hereby incorporated by reference herein and made a part of this specification.

TECHNICAL FIELD

The present invention belongs to the anti-seismic technical field of civil engineering and relates to a method for designing "strong column and weak beam" of a steel frame, and particularly relates to a method for designing "strong column and weak beam" of a steel frame beam-box column welded joint under bidirectional earthquake actions.

RELATED ART

"Strong column and weak beam" is of great significance to collapse prevention of a structure, which is an important content in seismic design in various countries in the world. At a current stage, a design philosophy of "strong column and weak beam" according to the code in China still stays at a plane structure calculation level, with checking calculation on plane directions where two principle axis are in only. However, an actual spatial structure under the bidirectional earthquake actions will be in a bidirectional stressed state, which greatly differs from the single earthquake action in a normative plane model.

Actual seismic hazards and studies show that under the bidirectional earthquake actions, deformation, energy dissipation and damage of columns are increased while those of beams are decreased; a beam-column sub structure designed according to the normative plane under the bidirectional actions cannot achieve performance under stress expected in unidirection. An overall frame structure designed according to the normative unidirectional "strong column and weak beam" equation cannot achieve a "strong column and weak beam" yield mechanism under the bidirectional earthquake actions. Therefore, to conduct studies on "strong column and weak beam" under the bidirectional earthquake actions is of important theoretical and practical significance to improve the anti-seismic safety and the collapse resistant capacity of the structure.

At present, an existing method for designing "strong column and weak beam" has made progress to a certain extent, which is achieved by controlling a full plastic flexural capacity matching relationship between a column and a beam connected to a same joint, i.e., the sum (called as column resistance herein) of full plastic strength $M_p^c$ of column ends at an intersection of the beam-column joint is not less than the sum (called as beam effect herein) of full plastic strength $M_p^b$ of beam ends. The "strong column and weak beam" to a certain extent is achieved by means of a certain strong column coefficient.

However, the bidirectional bending stressed state of the column under the bidirectional earthquake actions is not considered in the current code. Except for the bidirectional earthquake actions not considered, there are still following key factors needed to be considered critically:

Key factor 1: nonlinear reaction feature of each story of the frame structure in a strong earthquake. As the frame structure has a strong nonlinear reaction in the strong earthquake, change of its calculation model (as shown in (a) of FIG. 2) in the strong earthquake is caused. The current design equations all are based on an ideal beam-column sub-structure (an inflection point is at the center of the column) in form. The ideal model can reflect the test characteristics of the beam-column sub-structure well but is greatly different from the yield mechanism of the overall frame entering the elastic-plastic stage of the strong earthquake: a part of column pins and beam ends of the frame have formed plastic hinges, and the inflection points of frame columns are not located at the center point, resulting in that upper and lower column ends of the beam-column joint are unevenly stressed and are even reverse. Therefore, in the equations in current code, the upper and lower column ends are stressed synchronously by default. For the actual stress of the beam-column joint in the overall frame in the strong earthquake, it is not accurate enough and is unsafe.

Key factor 2: dynamic time-varying effect of column axial force in the strong earthquake. In the "strong column and weak beam" equation in China, the column axial pressure is usually the column axial pressure N in the frequently occurred earthquake combination. For the middle column, because beams are on both sides of the middle column, beam shearing forces under lateral seismic can be mutually balanced, so that the column axial pressure caused by the frequently occurred earthquake action is nearly zero. Therefore, in the time history, the real axial pressure (shown in (b) of FIG. 2) is kept invariable, and the "strong column and weak beam" equation is a conservative value for the axial pressure $N_{middle}$. In a case that there are no beams on single sides of the side and corner columns, in the time history of strong earthquake, unbalanced shear forces of the beams are overlapped, so that the column axial pressure changes severely. The column axial pressure in the frequently occurred earthquake combination may underestimate its maximum axial pressure in the time history. Owing to influence by factors such as randomness of seismic oscillation and form change of the frame structure, the maximum axial pressures of the side and corner columns cannot be precisely estimated. In this case, the "strong column and weak beam" equation is unsafe estimation for $N_{side}$ and $N_{corner}$ of the axial pressure.

Key factor 3: influence of the floorslabs on performance under stress of beams and columns. As far as beams are concerned, due to a combined action of the floorslabs on the beams, pure steel beams become combined beams with higher rigidity and strength, so that the beam effect in the "strong column and weak beam" equation is enhanced. As far as columns are concerned, because the major force transfer mode between the floorslabs and the columns is direct extrusion (shown in (a) of FIG. 2) of the floorslabs in a column width range, the box column may buckle locally before reaching full plastic bending strength, so that the column resistance in the "strong column and weak beam" equation is reduced. Reduction of the column resistance by the slabs is not considered in the equations in current code, and the current code include: Code for seismic design of buildings (GB 50011-2010), Technical specification for steel structure of tall building (JCJ 99-2015), Standard for design of steel structures (GB 50017-2017), Standard for design of steel structures (GB 50017-2017), ANSI/AISC 341-16, Seismic provisions for structural steel buildings, The Building Standard Law of Japan.

Action of enhancing the strength of the steel beam by the floorslabs is merely considered in the equation disclosed in NZS 3404: Part 1:1997, *Steel Structures Standard* based on the ultimate state (the floorslabs are stressed) of the combined beam of the beam-column sub-structure.

Key factor 4: strain hardening of the beam and column, superstrong material and the like. Deduction of the equation in current code is based on ideal elastic-plastic assumption of the material structure, i.e., the section is in the rectangular stress distribution state when full plasticity is achieved, and in this case, the bending rigidity of the corresponding section is zero. However, after yielding of the steel actually, there are second rigidity and strain hardening (shown in (d) of FIG. 2) which cannot be neglected, and the bending rigidity is gradually reduced with increase of the yield degree. In addition, random factors such as superstrong material in the actual steel, dimensional deviation of the actual beam-column member also affect the realization degree of the "strong column and weak beam".

SUMMARY OF INVENTION

To at least solve one of problems in the prior art, the present invention is conducted around the core problem of "strong column and weak beam" under the bidirectional earthquake actions. By clearing a normative unidirectional "strong column and weak beam" design concept and summarizing four key factors which need to be considered crucially in a method for designing the "strong column and weak beam", the bidirectional "strong column and weak beam" design concept of the present invention is formed in combination with the four key factors, which can provide the method for designing the "strong column and weak beam" of the steel frame structure under the bidirectional earthquake actions with reference.

To achieve the object of the present invention, the present invention provides a method for designing a "strong column and weak beam" of a steel frame beam-box column under bidirectional seismic, including the following steps:

S1: designing an initial frame;

S2: defining important beam-column joints and important sections at a designed (standard) axial compression ratio according to a calculated result of a response spectrum complete quadratic combination (CQC) method of the initial frame;

S3: unifying bidirectional column overdesign factor (COF) values of the important beam-column joints by means of fixing thickness of middle columns of the important beam-column joints, increasing beam strength of the important beam-column joints with increase of a story height, and inversely calculating the bidirectional COF value of each joint by virtue of column resistance $\Sigma M_p^c$ and a beam effect $\Sigma M_p^b$, where each of story edges, each of corner columns and each of middle columns are kept consistent in section;

S4: determining a degree to achieve the "strong column and weak beam", and proposing two quantifiable evaluation indexes P1 and P2 with reference to performance-based standard grades C and D; and S5: performing statistics on a damage index D of the frame after an elastic-plastic time-history analysis of selected twenty groups of natural waves, and acquiring a parameter frame meeting a target yield mechanism via the statistics performed on the damage index D in combination with an evaluation standard; if the parameter frame meets the evaluation standard, considering that the frame capable of achieving a target "strong column and weak beam" yield mechanism in the evaluation standard provided by the present invention; and if the parameter frame does not meet the evaluation standard, indicating that the designed frame under the bidirectional earthquake actions is not capable of achieving achieve the "strong column and weak beam" yield mechanism meeting the evaluation standard, and returning to S3 and re-designing the frame by enlarging the bidirectional COF values.

Further, in S1, the initial frame is a frame designed by applying conventional design software to satisfy checking calculation in a first stage of the structure in light earthquake combination.

Further, in S2, the important beam-column joints are joints with a designed (standard) axial compression ratio greater than 0.4 (0.35) after calculation by the response spectrum CQC method of the initial frame. The important sections are end sections of all upper and lower columns of the important beam-column joints.

Further, in S2, a calculation equation of the standard axial compression ratio is as follows:

$$\mu_p = \frac{N}{N_p}$$

where N is a column axial pressure (that the axial pressure of a lower column segment at the beam-column joint is uniformly taken to be) in a frequently occurred earthquake combination, and $N_p$ is a yield axial force of a section of the box column at an intersection of spatial beam-column joints.

Further, in S3, a relational expression between the bidirectional COF values and the column resistance and the beam effect is as follows:

for a uniform beam:

$$\sum\left(1 - \frac{N}{N_p}\right)M_{px} \geq COF \cdot \sqrt{\left(\sum M_{px}^b\right)^2 + \left(\sum M_{py}^b\right)^2}$$

for a beam with a variable section at a flange of an end plate:

$$\sum\left(1 - \frac{N}{N_p}\right)M_{px} \geq COF \cdot \sqrt{\left(\sum \left(M_{px}^b + M_{vx}\right)\right)^2 + \left(\sum \left(M_{py}^b + M_{vy}\right)\right)^2}$$

where N is the column axial pressure (that the axial pressure of a lower column segment at the beam-column joint is uniformly taken to be) in the frequently occurred earthquake combination; $N_p$ and $M_{px}$ are respectively the yield axial force of a section of the box column at an intersection of spatial beam-column joints and a full plastic bending moment around a main axis (unidirection); $M_{px}^b$, $M_{vx}$, $M_{py}^b$ and $M_{vy}$ are respectively full plastic bending moments of steel beams (not reinforced) in x and y planes at the intersection of spatial beam-column joints and additional bending moments generated by transferring plastic hinges; COF is a bidirectional strong column coefficient corresponding to a bidirectional equation, and in the above two equations, the left equation is defined as the column resistance $\Sigma M_p^c$ and the right equation is defined as the beam effect $\Sigma M_p^b$.

Further, in S3, after considering a condition of a neutral axis position with different plasticity in section discussed in a column resistance item under the bidirectional earthquake actions, the unidirectional bending full plastic strength $M_{px}$ around the major axis is taken in the designed axial compression ratio considered in the present invention as the conservative value. Based on that the column is subjected to full plastic strength of the orthogonal beam, by considering inconsistent amplitudes and phases of seismic waves, square root of the sum of the square of the full plastic bending moment of the beam around the major axis is conservatively taken as the beam effect in the bidirectional equation.

Further, in S4, the performance-based standard grades C and D are grades C and D correspondingly required in *Standard for Performance-based Seismic Design of Building Structures* published in 2022, and the grades C and D are called as the "strong column and weak beam".

Further, in S4, equations for the evaluation indexes $P_1$ and $P_2$ are as follows:

for the "strong column and weak beam" at the grade C:

$$\begin{cases} P_1^C = \max\left\{\dfrac{L4\%}{30\%}, \dfrac{L5\% + L6\%}{5\%}\right\} \leq 1 \\ P_2^C = \dfrac{L4\%}{30\%} + \dfrac{L5\% + L6\%}{5\%} \leq 1 \end{cases}$$

for the "strong column and weak beam" at the grade D:

$$\begin{cases} P_1^D = \max\left\{\dfrac{L5\%}{30\%}, \dfrac{L6\%}{5\%}\right\} \leq 1 \\ P_2^D = \dfrac{L5\%}{30\%} + \dfrac{L6\%}{5\%} \leq 1 \end{cases}$$

where L4%, L5% and L6% are respectively proportions of damage grades being L4, L5 and L6 in the important sections. The damage grades are divided with reference to the performance-based standard, with an evaluation standard flow shown in FIG. 1.

Further, in S4, by taking the degree of "strong column and weak beam" achieving the grade D as an example, the situation that a mean value of $P_1^D$ or $P_2^D$ of the frame under 20 groups of natural waves plus one time standard deviation $\mu+\sigma$) is not greater than 1, represents that the frame has an enough probability to achieve the "strong column and weak beam" yield mechanism at the grade D; the situation that only the mean value ($\mu$) is not greater than 1, representing that the frame can achieve the "strong column and weak beam" yield mechanism at the grade D in an average sense; and the situation that statistical values of the evaluation indexes all are greater than 1, represents that the frame does not meet the requirements of the "strong column and weak beam".

Further, in S5, the damage index D is a ratio of the maximum (pressure) strain $\varepsilon_{max}$ to yield strain $\varepsilon_y$ of all important sections in the seismic time-history analysis, with an equation as follows:

$$D = \frac{\varepsilon_{max}}{\varepsilon_y}$$

Further, applications of the design method need to meet the following requirements: 1) the design method is suitable for a condition that the designed axial compression ratio of the frame in the frequently occurred earthquake combination is 0.4-0.6; 2) an extrusion effect of a floorslab on the frame column is neglected; 3) random factors such as superstrong steel and a dimensional deviation of an actual beam-column member are neglected; 4) each of the story edges and corner columns are consistent with the middle columns in the parameter frame; and 5) it is considered that variables of each frame merely lies in a strict degree (bidirectional COF values) to control the "strong column and weak beam", and an good-bad degree of the bidirectional COF value can be evaluated by evaluating the anti-seismic performance of different bidirectional COF frames and stress conditions of the members in a strong earthquake.

Compared with an existing design method for "strong column and weak beam", the method for designing a "strong column and weak beam" of a steel frame beam-box column under bidirectional seismic provided by the present invention at least has the advantages:

1) the present invention can predict the yield mechanism of "strong column and weak beam" of the steel frame under the bidirectional earthquake actions precisely, and compared with an existing design method based on the unidirectional earthquake action, the present invention is of better scientificity and reasonability;

2) the bidirectional "strong column and weak beam" equation provided by the present invention and the equation in current code can be traced to the same origin in form, and the realization degree is controlled by a specific factor COF (strong column coefficient n in the corresponding code), which facilitates learning by engineers and actual engineering applications;

3) the present invention provides that an adverse energy dissipation mechanism may be avoided that the "strong beam and weak column" and the frame column are damaged under the actual earthquake action earlier than the beam caused by the neglected four key factors under the bidirectional earthquake actions, which is beneficial to reducing the potential safety hazards of engineering.

DESCRIPTION OF EMBODIMENTS

In order to make objectives, technical solutions and advantages of the embodiments of the present invention clearer, description will be made on technical solution in the embodiment of the present invention below in combination with drawings in the embodiment of the present invention. It is apparent that the described embodiments are a part of embodiments of the present invention rather than all the embodiments. On the basis of the embodiments in the present invention, all other embodiments obtained by those skilled in the technical field without creative efforts fall into the scope of protection of the present invention.

Figure 1:
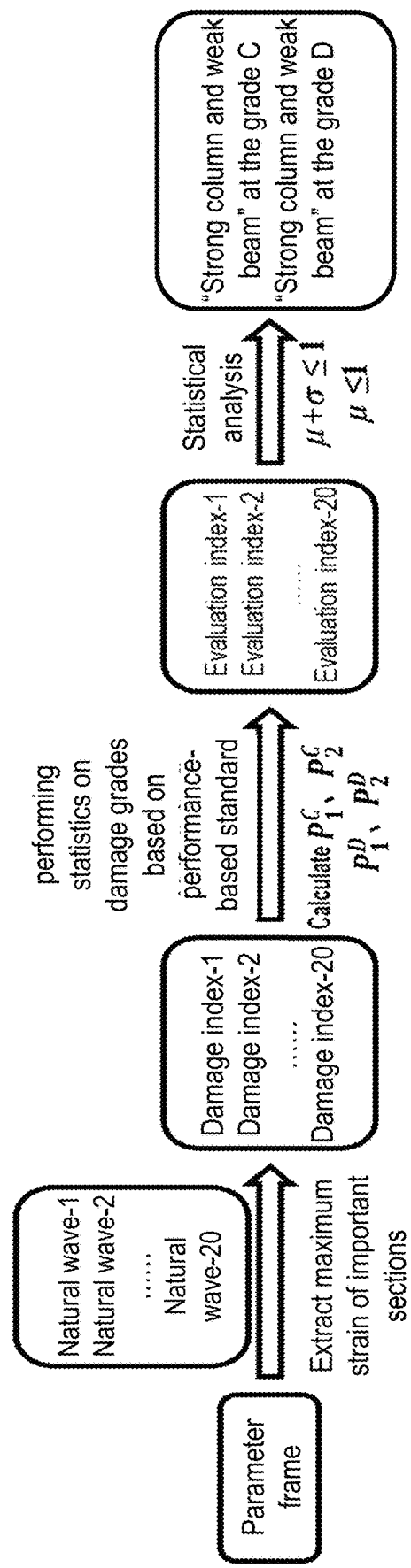
FIG. 1 is a flow chart of an evaluation standard.
Figure 2:
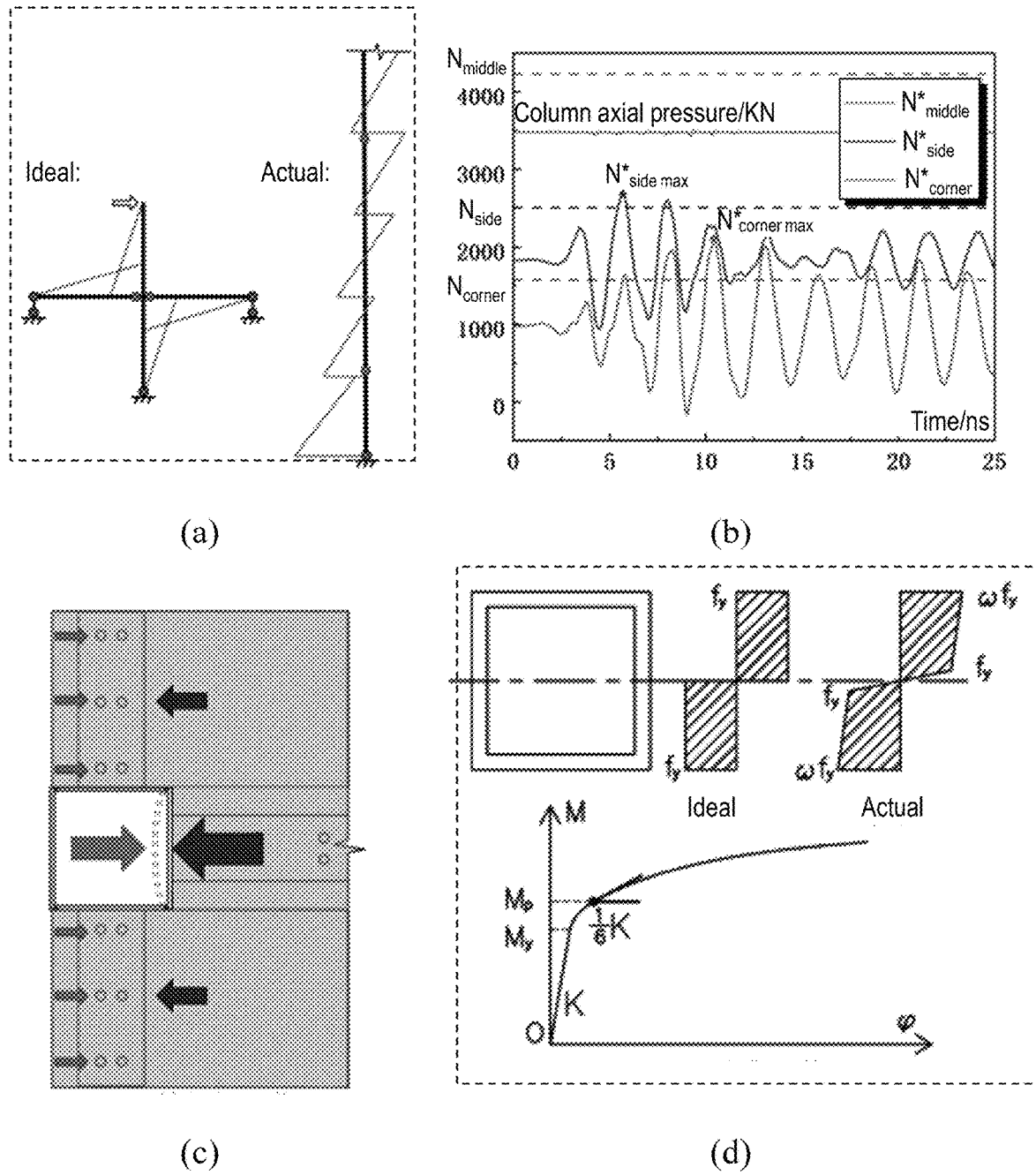
FIG. 2 is a diagram illustrating four key factors, where the figure (a) is a stress different diagram of an ideal substructure-actual frame; the figure (b) is a comparison diagram of a time history of a column axial force; the figure (c) is an extrusion action diagram of floorslabs; and the figure (d) is a strain hardening diagram.
Figure 3:
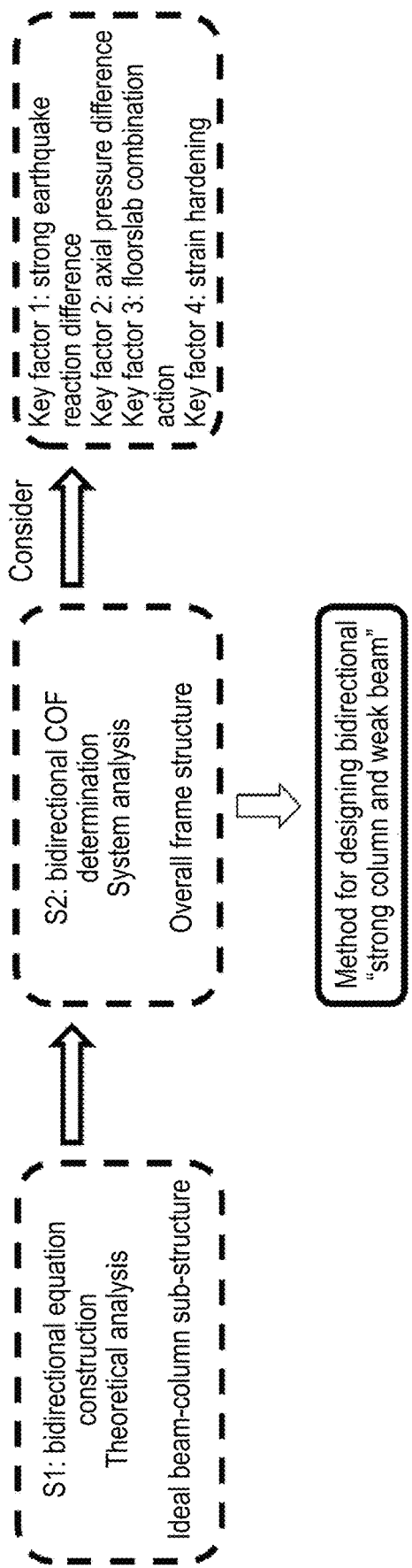
FIG. 3 is a flow chart of a method for designing bidirectional "strong column and weak beam".

FIG. 3 is a flow chart of a method for designing bidirectional "strong column and weak beam". FIG. 1 is a flow chart of an evaluation standard of the present invention. The key factors 1-4 shown in FIG. 2 are influence not considered by "strong column and weak beam" equations in the current code. The embodiment of the present invention will establish a design method under the bidirectional earthquake actions by performing elastic-plastic time-history analysis on the system through a frame model at a spatial level, reflecting the four key factors in bidirectional COF value determination and continuing the capacity design method in the current code. It is worth noting that in column resistance, the single bending full plastic strength of the column is taken as a representative value, and the value is a biased safety value at the designed axial compression ratio considered in the present invention through theoretical deduction and a testing phenomenon of the box column at 45° and in any direction. Moreover, through the testing phenomenon and finite element parameter analysis, it is verified that the column buckling phenomenon due to existence of the floorslabs is appeared after the important section reaching the maximum strain limitation, i.e., the target "strong column and weak beam" degree under the evaluation standard of the present invention is not affected by the existence of the floorslabs, so that the extrusion action of the floorslabs on the column is not considered.

An analytical concept and a simplified concept of the present invention are as follows:

1) the method for designing "strong column and weak beam" is within a common designed axial compression ratio range, and is set out from construction of the equation form and COF value determination. First, construction of the equation form is combined with theoretical analysis of the column resistance and the beam effect under the bidirectional earthquake actions and the single capacity design method (the column resistance is not less than the beam effect) of reference code. Second, bidirectional COF value determination considers the four key factors which are not considered in the specification through system analysis: strong earthquake reaction difference, axial pressure dynamic time-varying difference, floorslab combined action and strain hardening.

2) Determination of the construction of the bidirectional "strong column and weak beam" design equation. Its major construction is still the capacity design method, requiring that the column resistance $\Sigma M_p^c$ is not less than the beam effect $\Sigma M_p^b$. Different from the normative bidirectional earthquake actions, the column resistance and the beam effect under bidirectional stress need to be theoretically deduced below.

It is found, by deducing the bidirectional bending full plastic strength of the column resistance (bended at) 45° based on the box section, that the plastic neutral axis of the section will rotate and translate to different extent due to different beam effect and axial pressure of the column in the orthogonal direction, resulting in that there are several conditions for bidirectional bending calculation diagrams, and the studied parameters are nondimensionalized to the following three-variable bi-parameter equation, so that a concise equation form cannot be obtained.

$$\begin{cases} \dfrac{N}{N_p} = \dfrac{2-\beta-\gamma}{2} \\ \dfrac{M_x}{M_{px}} = \dfrac{2}{3}[\gamma+\beta(1-\beta)], 0 \le \beta, \gamma \\ \dfrac{M_y}{M_{py}} = \dfrac{2}{3}[\beta+\gamma(1-\gamma)] \end{cases}$$

Figure 4:
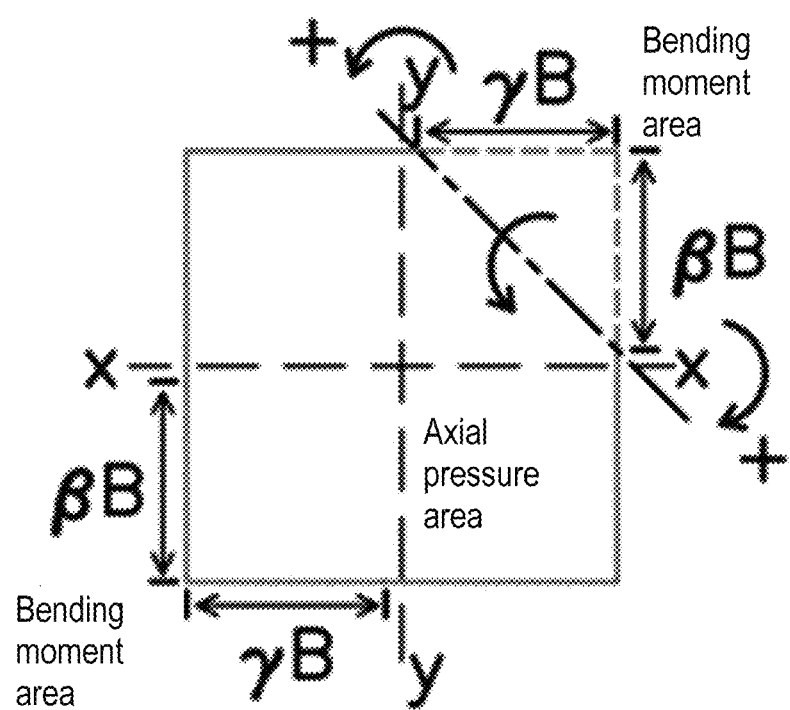
FIG. 4 is a bidirectional bending calculation diagram.

N and $N_p$ are respectively an axial force and a yield axial force of the column section in the frequently occurred earthquake combination, $M_x$, $M_{px}$, $M_y$ and $M_{py}$ are respectively bending moments and full plasmic pure bending strength of the column section in a strong axis direction, and β and γ are parameters of the plastic neutral axis position. As shown in FIG. 4, by assuming t/B≈0 (t is the thickness of the box column), the box section can be simplified as a simplified calculation model with area concentrated on a side line, where a fine dotted line and a solid line of the side line respectively represent tensioned and pressed areas where the stress reaches the yield strength.

Figure 5:
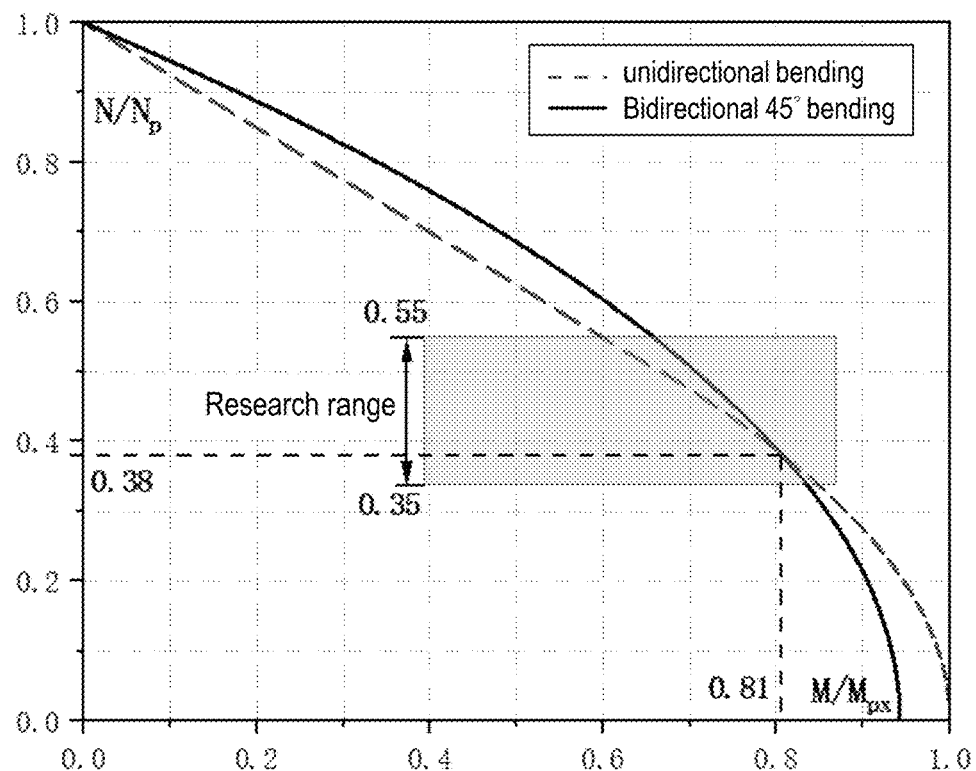
FIG. 5 is a schematic diagram of a bidirectional 45-degree bending related curve of a box section.

When assumption at the 45° direction (special) is taken, there is β=γ which is substituted into the above equation to eliminate β and γ to synthesize $M_x$ and $M_y$. The relational equation between 45° bending full plastic strength and the axial pressure is as follows:

$$\dfrac{M_{cp45}}{M_{px}} = \dfrac{2\sqrt{2}}{3}\left[1-\left(\dfrac{N}{N_p}\right)^2\right]$$

$$A\dfrac{M}{M_{px}} - \dfrac{N}{N_p}$$

curve is drawn, as shown in FIG. 5 (M corresponds to $M_x$ and $M_{cp45°}$ in two curves in FIG. 5). When the standard axial compression ratio is greater than 0.38, the bidirectional 45° bending full plastic strength will be greater than the unidirectional bending full plastic strength. Moreover, in the standard axial compression ratio range of the present invention, the unidirectional bending full plastic strength is the biased safety estimation of bidirectional 45° bending full plastic strength in most cases with little difference therebetween. Therefore, when the beam effects of the box column in the orthogonal direction are consistent, the bidirectional full plastic strength of the column can be replaced by the unidirectional full plastic strength.

Figure 6:
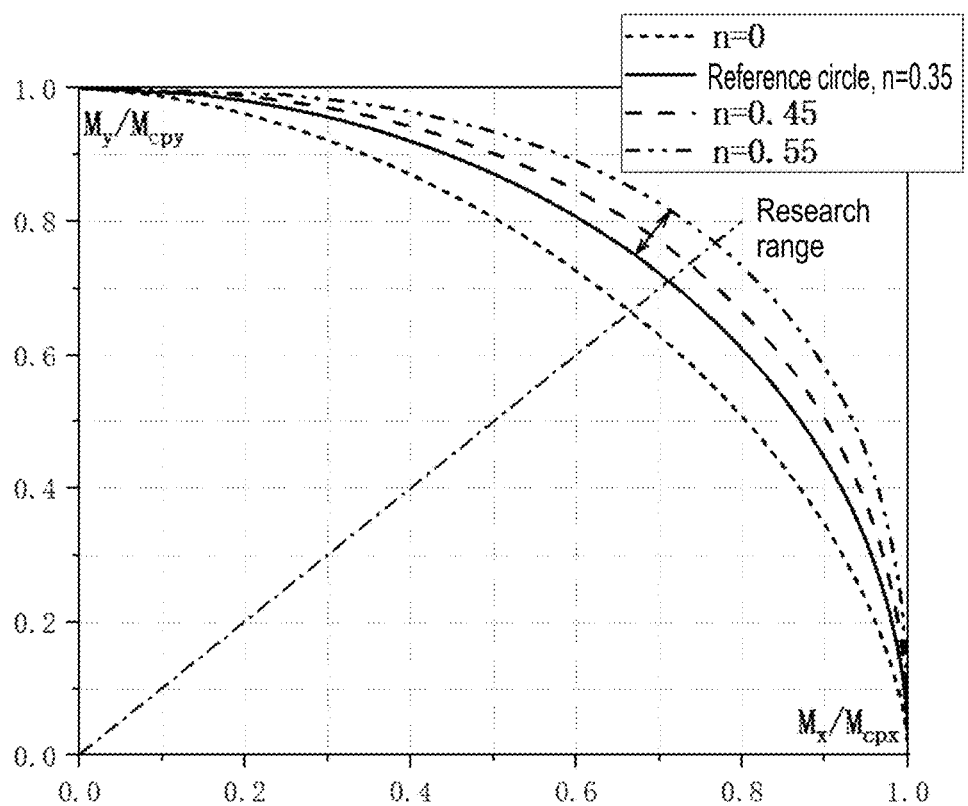
FIG. 6 is a schematic diagram of a bidirectional bending related curve of the box section.

In considering bending at any angle, i.e., the beam effects of the box column in the orthogonal direction are inconsistent, an approximate equation is obtained below by way of performing numerical value calculation first and then curve fitting:

$$\left(\frac{M_x}{M_{cpx}}\right)^\tau + \left(\frac{M_y}{M_{cpy}}\right)^\tau = 1$$

$$\tau = 1.7 - \frac{n}{\ln n}$$

where $M_{cpx}$ and $M_{cpy}$ are respectively unidirectional bending full plastic strength, and $\tau$ is a parameter only related to the standard axial compression ratio $$n = \frac{N}{N_p}.$$

nondimensionalized bidirectional bending related curve $$\frac{M_x}{M_{cpx}} - \frac{M_y}{M_{cpy}}$$

is drawn, as shown in FIG. 6. With the studied axial compression ratio, when the angle is constant, and the related curve is fuller with increase of the axial compression ratio, i.e., the ratio of the bidirectional bending plastic strength to the unidirectional full plastic strength is greater. With increase of the axial compression ratio in the 45° direction, the change of the bending full section plastic strength is maximum.

In conclusion, the bending full section plastic strength of the column around the major axis in any direction is smaller than that around other axes, so that the bidirectional bending full plastic strength is replaced by the unidirectional bending full plastic strength of the box section to consider the bidirectional stress state of the column, which is the biased safety estimation.

Figure 7:
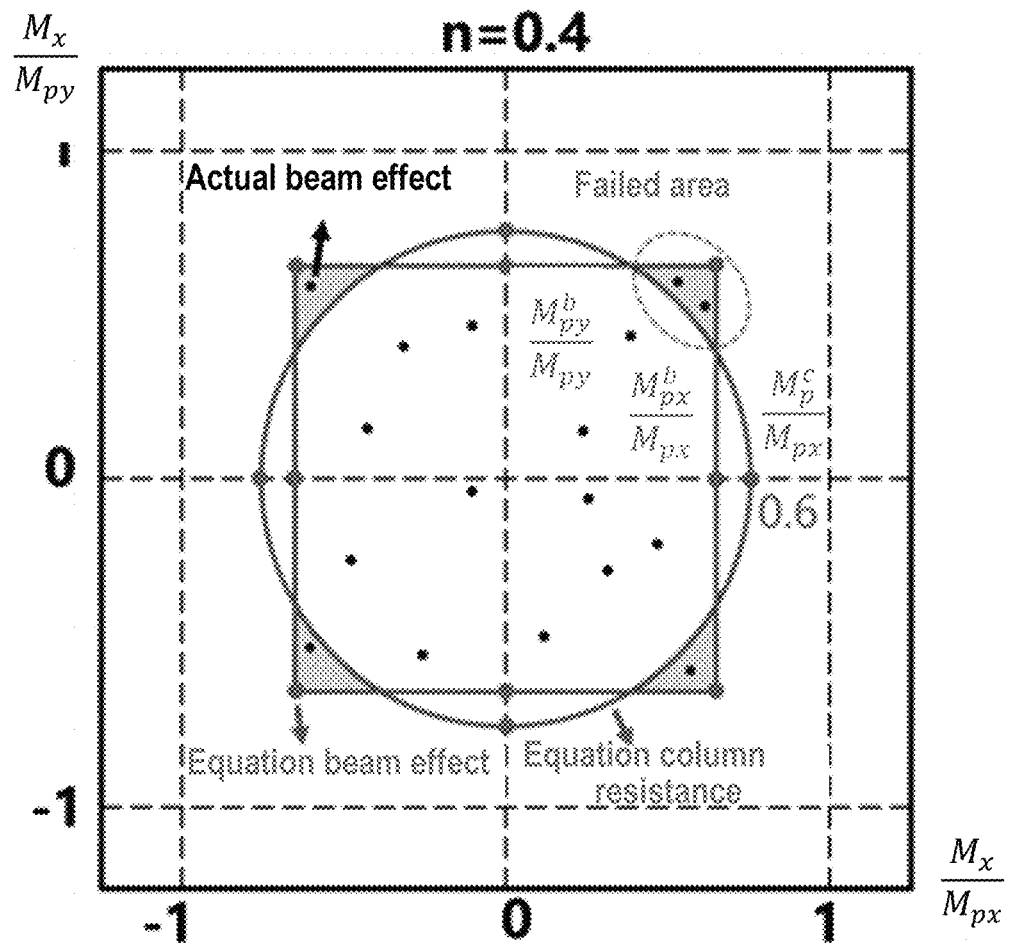
FIG. 7 is an equation description diagram.

For the beam effect, due to inconsistent amplitudes and phase of seismic waves in primary and secondary directions of the actual bidirectional seismic oscillation, the probability that the beams in two orthogonal directions reach the maximum beam effect in the time history is very small (in the present invention, the primary and secondary waves of the bidirectional earthquake actions extend along two major axis directions of the frame by default). As shown in FIG. 7, black scatters show the actual beam effect in the time history of bidirectional seisms. The full plastic strength of the steel beams in two orthogonal directions form a black block (a beam effect envelope line considered in the equation), and the intersection of the block and the transverse and longitudinal axes are the beam effect in the single equation in the current code. If the time history difference problem of the actual orthogonal beam effect is considered in the bidirectional equation, the most disadvantageous combination of different orthogonal beam effects will be obtained by different seismic waves and different frame structures, so that a deterministic law cannot be summarized. Therefore, to facilitate applications, the bidirectional equation in the present invention will be based on a condition that the column is subjected to full plastic strength (i.e., angular points in the black block) of the orthogonal beams at the same time. Therefore, the beam effect in the bidirectional equation shall take the following equation:

$$M_p^b = \sqrt{\left(\sum M_{px}^b\right)^2 + \left(\sum M_{py}^b\right)^2}$$

where $M_{px}^b$ and $M_{py}^b$ are respectively full plastic bending moments of the steel beams (not reinforced) in the x and y planes at the intersection of the spatial beam-column joints.

3) Determination of the bidirectional COF values. A parameter frame for a plurality of bidirectional COF is designed and calculated, the damage indexes D—the ratio of the maximum (pressure) strain $\varepsilon_{max}$ to the yield strain $\varepsilon_y$ in the seismic time history, of all important sections in the frame under the actions of a plurality of groups (for example, 20 groups) of natural waves are extracted, and performing statistics on the parameter frame which has an enough probability and achieves the yield mechanism of "strong column and weak beam" at the target grade in an average sense is according to the evaluation indexes $P_1$ and $P_2$ proposed.

4) the formed parameter frame with the plurality of different bidirectional COF values shall meet checking calculation of light earthquake combination. After increasing the strength of the beam of the important beam-column joint with increase of story height and by increasing the wall thickness of the column when the bidirectional COF of each frame is unified, the parameter frame still meets the light earthquake combination design. Moreover, the principle that the beam height is decided by span in the actual engineering is met, so that the bidirectional COF values are unified by adjusting the beam strength rather than the sectional dimension.

5) four key factors neglected in the current code are considered. For the key factor 1, an ideal beam-column sub-structure-based model distinguished from the current code is analyzed by the system, and a design method based on plane frame in the current code is propelled into the spatial frame level; for the key factor 2, using the strong earthquake elastic-plastic time-history analysis method to distinguish from the defect in considering the time-varying effect on the column axial pressure in the current code; and for the key factor 3, the floorslab effect of the parameter frame is considered: (1) in-plane effect of the floorslab: because the floorslab is free of holes, the in-plane rigidity is infinitely great, so that a rigid floorslab assumption is still used. (2) out-plane effect of the floorslab: amplification of the beam rigidity and strength by the floorslab is considered by using the fiber section of the combined beam, and slippage between the steel beam and the concrete board is neglected. (3) influence of the floorslab on the column resistance is not counted: for the key factor 4, steel in the calculation model uses the bilinear kinematic hardening structure, the second rigidity and strain hardening of the steel neglected in the current code are considered, and it is assumed that random factor influence such as superstrong material and dimensional deviation of the actual beam-column member is not considered.

After being simplified, the present invention provides a method for designing a "strong column and weak beam" of a steel frame beam-box column under bidirectional seismic, including the following steps:

S1: designing an initial frame;
in some embodiments of the present invention, the initial frame is a frame designed by applying conventional design software to satisfy checking calculation of the structure in light earthquake combination in a first stage.

S2: defining important beam-column joints and important sections at a designed (standard) axial compression ratio according to a calculated result of a response spectrum complete quadratic combination (CQC) method of the initial frame, where the important beam-column joints are joints with the designed axial compression ratio not meeting checking calculation of a strong column and weak beam in a current code after calculation by the response spectrum CQC method of the initial frame, i.e., the designed axial compression ratio (the axial compression ratio calculated by a designed value of yield strength) is less than 0.4, and the standard axial compression ratio (the axial compression ratio calculated by a standard value of the yield strength) is less than 0.35. The important sections are end sections of all upper lower columns of the important beam-column joints, and a calculation equation of the standard axial compression ratio is as follows:

$$\mu_p = \frac{N}{N_p}$$

in the equation:

$\mu_p$ is a standard axial compression ratio;

N is a column axial pressure in the frequently occurred earthquake combination (in some embodiments of the present invention, the axial pressure of a lower column segment at the beam-column joint is uniformly taken) and $N_p$ is a yield axial force of a section of the box column at an intersection of spatial beam-column joints.

S3: unifying bidirectional column overdesign factor (COF) values of the important beam-column joints by means of fixing thickness of middle columns of the important beam-column joints, increasing beam strength of the important beam-column joints with increase of a story height, and inversely calculating the bidirectional COF value of each joint by virtue of column resistance $\Sigma M_p^c$ and a beam effect $\Sigma M_p^b$, where each of story edges, each of corner columns and each of middle columns are kept consistent in section;

A relational expression between the bidirectional COF values and the column resistance and the beam effect is as follows:

for a uniform beam:

$$\sum \left(1 - \frac{N}{N_p}\right) M_{px} \geq COF \cdot \sqrt{\left(\sum M_{px}^b\right)^2 + \left(\sum M_{py}^b\right)^2}$$

for a beam with a variable section at a flange of an end plate:

$$\sum \left(1 - \frac{N}{N_p}\right) M_{px} \geq COF \cdot \sqrt{\left(\sum \left(M_{px}^b + M_{vx}\right)\right)^2 + \left(\sum \left(M_{py}^b + M_{vy}\right)\right)^2}$$

In the equation:

$M_{px}$ is a full plastic bending moment of the section of the box column at the intersection of the spatial beam-column joint around a main axis (unidirection);

$M_{px}^b$ and $M_{py}^b$ are respectively full plastic bending moments of the steel beams which are not reinforced in the x and y planes at the intersection of the spatial beam-column joints;

$M_{vy}$ and $M_{vx}$ are respectively additional bending moments generated by transferring plastic hinges in the x and y planes at the beam end; and COF (Column Overdesign Factor) corresponds to the bidirectional strong column coefficient in the bidirectional equation of the present invention.

After considering a condition of a neutral axis position with different plasticity in section discussed in a column resistance item under the bidirectional earthquake actions, the unidirectional bending full plastic strength $M_{px}$ around the major axis is taken in the designed (standard) axial compression ratio considered in the present invention as the conservative value. Based on that the column is subjected to full plastic strength of the orthogonal beam simultaneously, square root of the sum of the square of the full plastic bending moment of the beam around the major axis is conservatively taken as the beam effect in the bidirectional equation.

S4: a degree to achieve the "strong column and weak beam" is determined, and two quantifiable evaluation indexes $P_1$ and $P_2$ are proposed with reference to grades C and D in *Standard for Performance-based Seismic Design of Building Structures* published in 2022, the grades C and D being referred to as "strong column and weak beam" at grades C and D in the present invention, where for the "strong column and weak beam" at the grade C:

$$\begin{cases} P_1^C = \max\left\{\frac{L4\%}{30\%}, \frac{L5\% + L6\%}{5\%}\right\} \leq 1 \\ P_2^C = \frac{L4\%}{30\%} + \frac{L5\% + L6\%}{5\%} \leq 1 \end{cases}$$

for the "strong column and weak beam" at the grade D:

$$\begin{cases} P_1^D = \max\left\{\frac{L5\%}{30\%}, \frac{L6\%}{5\%}\right\} \leq 1 \\ P_2^D = \frac{L5\%}{30\%} + \frac{L6\%}{5\%} \leq 1 \end{cases}$$

In the equation:

where L4%, L5% and L6% are respectively proportions of damage grades being L4, L5 and L6 in the important sections. The damage grades are divided with reference to the performance-based standard, with an evaluation standard flow shown in FIG. 1.

In the *Standard for Performance-based Seismic Design of Building Structures*, the frame at the grade C in the strong earthquake needs to meet the following conditions: the damage grade of the column member is within the range of L3-L4, where the damage grade of a part of column members is L4; and the frame at the grade D in the strong earthquake needs to meet the following conditions: the damage grade of the column member is within the range of L4-L5, where the damage grade of a part of column members is L5.

In the present invention, the grades C and D are taken as a performance target of the parameter frame, specification thereof in the strong earthquake corresponds to two grades of the degree to implement the "strong column and weak beam", and specification in the standard is quantized as $P_1^C$, $P_2^C$, $P_1^D$ and $P_2^D$.

$P_1^C$ and $P_2^C$ respectively represent that the important sections need to meet the following conditions: 1) the proportion with the damage grade L4 does not exceed 30%

(the damage grade of only part of column members is L4, and that of the rest column members is L3 or below); and 2) the proportions with the damage grade L5 and above do not exceed 5%; and in a similar manner, and $P_1^D$ and $P_2^D$ respectively represent that the important sections need to meet the following conditions: 1) the proportion with the damage grade L5 does not exceed 30%; and 2) the proportion with the damage grade L6 does not exceed 5%.

S5: performing statistics on a damage index D of the frame after an elastic-plastic time-history analysis of selected twenty groups of natural waves, and acquiring a parameter frame meeting a target yield mechanism via the statistics performed on the damage index D in combination with an evaluation standard; if the parameter frame meets the evaluation standard, it is considered that the frame is able to achieve a target "strong column and weak beam" yield mechanism in the evaluation standard provided by the present invention; and if the parameter frame does not meet the evaluation standard, indicating that the designed frame under the bidirectional earthquake actions cannot achieve the "strong column and weak beam" yield mechanism meeting the evaluation standard, and it is returned to S3 and the frame is re-designed by enlarging the bidirectional COF values. A calculation equation of the damage index D is as follows:

$$D = \frac{\varepsilon_{max}}{\varepsilon_y}$$

in the equation:

$\varepsilon_{max}$ is maximum (pressure) strain of important sections;

$\varepsilon_y$ is yield strain of important sections.

In the step, by taking the degree of "strong column and weak beam" achieving the grade D as an example, the situation that a mean value of $P_1^D$ or $P_2^D$ of the frame under the plurality of groups of natural waves plus one time standard deviation ($\mu+\sigma$) is not greater than 1, represents that the frame has an enough probability to achieve the "strong column and weak beam" yield mechanism at the grade D; the situation that only the mean value ($\mu$) is not greater than 1, represents that the frame can achieve the "strong column and weak beam" yield mechanism at the grade D in an average sense; and the situation that counted values of the evaluation indexes all are greater than 1, represents that the frame does not meet the requirements on the "strong column and weak beam"; when the grade C is achieved, mean value of $P_1^C$ or $P_2^C$ of the frame under the plurality of groups of natural waves plus one time standard deviation ($\mu+\sigma$) is not greater than 1, representing that the frame has an enough probability to achieve the "strong column and weak beam" yield mechanism at the grade C; the situation that only the mean value ($\mu$) is not greater than 1, represents that the frame can achieve the "strong column and weak beam" yield mechanism at the grade C in an average sense; and the situation that counted values of the evaluation indexes all are greater than 1, represents that the frame does not meet the requirements of the "strong column and weak beam" herein.

Figure 8:
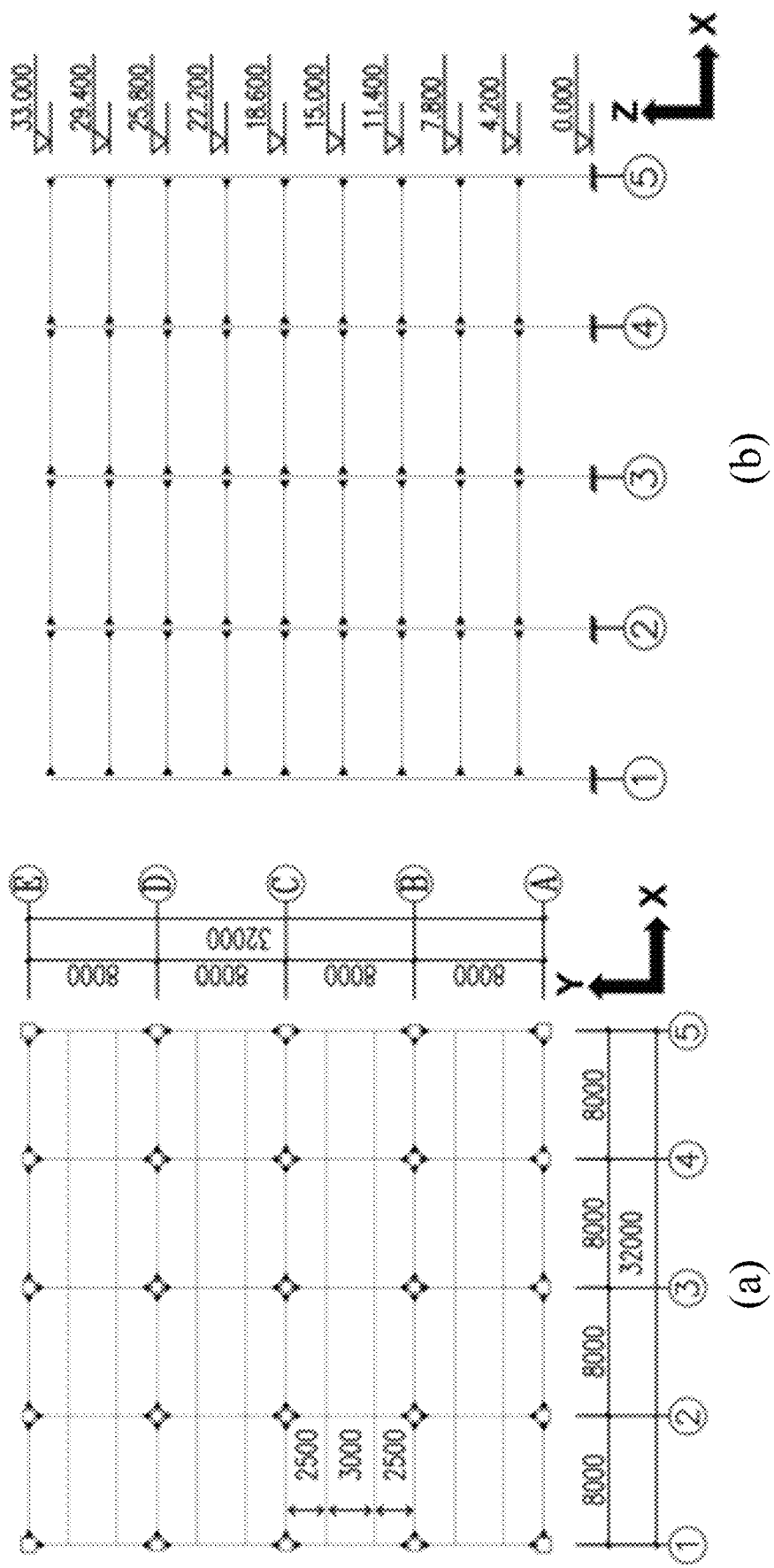
FIG. 8 is a structural arrangement diagram, where (a) is a layout chart and (b) is an elevation chart.
Figure 9:
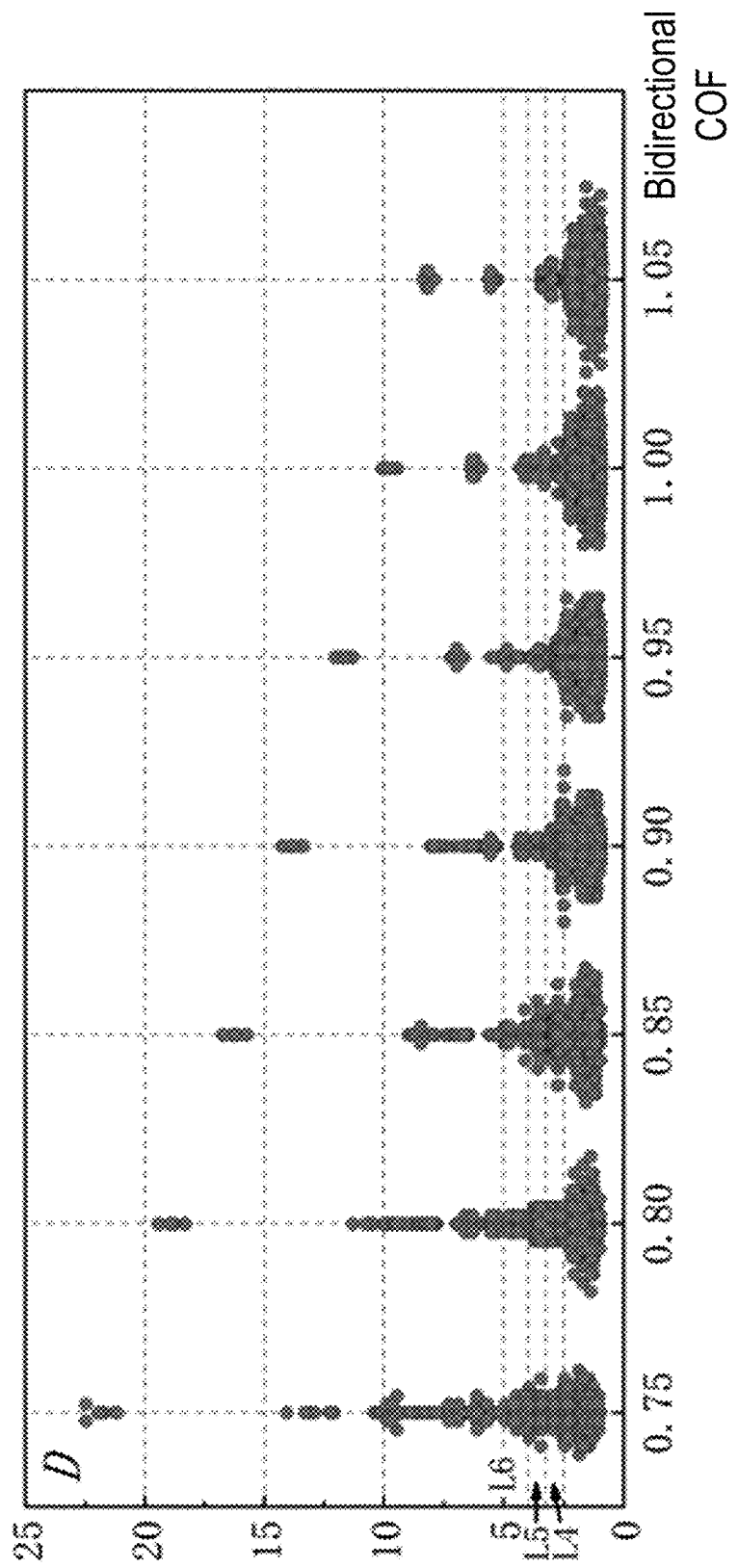
FIG. 9 is a relational graph of bidirectional COF-damage index of a parameter frame under 20 groups of natural waves.
Figure 10:
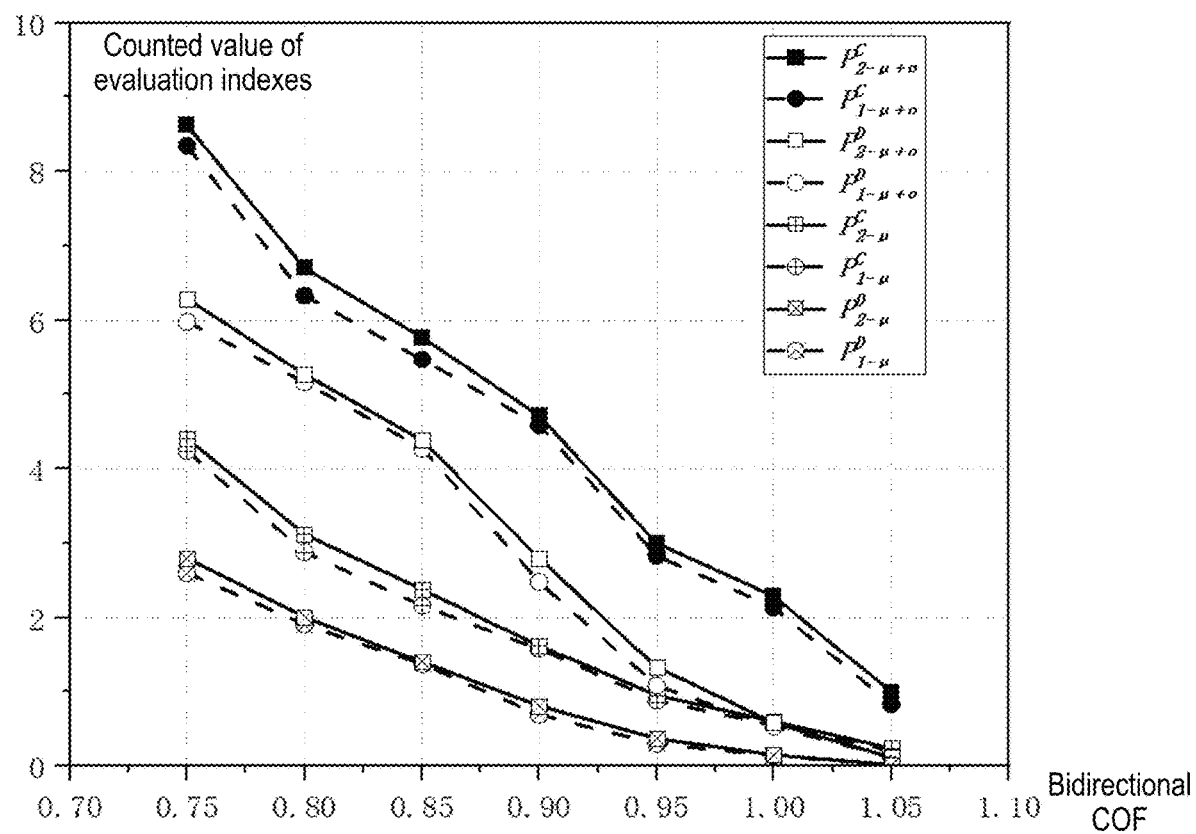
FIG. 10 is a curve graph of statistical values of bidirectional COF-damage index of the parameter frame under 20 groups of natural waves.

In some embodiments of the present invention, the given table 1 show a nine-story frame with a plurality of parameters designed according to step 3. The initial frame structure arrangement diagram is shown in FIG. 8. Under the bidirectional earthquake actions, the corresponding parameter frame in the table 1 is implemented. When the bidirectional COF is 0.9, 0.95, 1.0 and 1.05 (the strong column coefficient η of the corresponding equation in the code are 1.27, 1.34, 1.41 and 1.48, the code here refers to *Code for seismic design of buildings* (GB 50011-2010), the corresponding equation is as follows:

$$\sum W_{pc}\left(f_{yc} - \frac{N}{A_C}\right) = \sum \left(1 - \frac{N}{N_y}\right) M_{px} \geq \eta \cdot W_{pb} f_{yb},$$

where $W_{vc}$ and $W_{vb}$ are respectively the plastic section modulus of the column and beam in the plane of the beam column joint calculation, $f_{yc}$ and $f_{yb}$ are respectively the yield strength of the column and beam, N is a column axial pressure in a frequently occurred earthquake combination, $A_c$ is the cross-sectional area of the frame column, $N_y$ is the yield axial force of the column, $M_{px}$ is the full plastic pure bending strength of the column section, and η is the strength column coefficient in the code), the parameter frame meets the yield mechanism of "strong column and weak beam" at different degrees under the evaluation standard of the present invention, and counted results are shown in FIGS. 9 and 10. Specifically, the parameter frame with bidirectional COF=0.85 and below does not meet the requirements on "strong column and weak beam" here, the parameter frame with bidirectional COF=0.9 and above can achieve the yield mechanism of "strong column and weak beam" at the grade D in the average sense, the parameter frame with bidirectional COF=0.95 and above can achieve the yield mechanism of "strong column and weak beam" at the grade C in the average sense, the parameter frame with bidirectional COF=1.0 and above has an enough probability to achieve the yield mechanism of "strong column and weak beam" at the grade D, and the parameter frame with bidirectional COF=1.05 and above has an enough probability to achieve the yield mechanism of "strong column and weak beam" at the grade C, indicating that the COF in the equation in current code is to be improved. The strong column coefficient is a coefficient in the check calculation equation for strong columns and weak beams in domestic and foreign codes/standards; The COF in the present application considers four key factors (1. nonlinear reaction feature of each story of the frame structure in a strong earthquake; 2. dynamic time-varying effects of column axial forces in the strong earthquake; 3. influence of floor slabs on the performance under stress of beams and columns; 4. strain hardening of the beam and column, superstrong material) to determine the strong column coefficient.

TABLE 1

Frame parameter table

| Frame name | $t_c$/mm | Two-story $f_{yb}$/Mpa | Three-story $f_{yb}$/Mpa | Four-story $f_{yb}$/Mpa | Major cycle |
|---|---|---|---|---|---|
| Initial frame with floorslabs | 14 | 345 | 345 | 345 | 2.219, 1.940 |
| Bidirectional COF0.75 frame | 14 | 389 | 432 | 474 | 2.219, 1.940 |

TABLE 1-continued

Frame parameter table

| Frame name | $t_c$/mm | Two-story $f_{y,b}$/Mpa | Three-story $f_{y,b}$/Mpa | Four-story $f_{y,b}$/Mpa | Major cycle |
|---|---|---|---|---|---|
| Bidirectional COF0.80 frame | 14.45 | 385 | 425 | 465 | 2.209, 1.932 |
| Bidirectional COF0.85 frame | 14.92 | 383 | 421 | 458 | 2.199, 1.924 |
| Bidirectional COF0.90 frame | 15.39 | 381 | 416 | 452 | 2.189, 1.915 |
| Bidirectional COF0.95 frame | 15.86 | 379 | 412 | 446 | 2.179, 1.907 |
| Bidirectional COF1.00 frame | 16.34 | 377 | 409 | 441 | 2.168, 1.896 |
| Bidirectional COF1.05 frame | 16.34 | 377 | 409 | 441 | 2.159, 1.890 |

Note: the major cycles refer to first and second-order cycles and a third-order cycle, $t_c$ is a column thickness, and $f_{y,b}$ is strength of beam of each story.

Applications of the design method provided in the above embodiments of the present invention need to meet the following requirements: 1) the design method is suitable for a condition that the designed axial compression ratio of the frame in the frequently occurred earthquake combination is 0.4-0.6 (the corresponding standard axial compression ratio is 0.35-0.55); 2) an extrusion effect of a floorslab on the frame column is neglected; 3) random factors such as superstrong steel and a dimensional deviation of an actual beam-column member are neglected; 4) each of the story edges and corner columns are consistent with the middle columns in the parameter frame; and 5) it is considered that variables of each frame merely lies in a strict degree (bidirectional COF values) to control the "strong column and weak beam", and an appropriate degree of the bidirectional COF value can be evaluated by evaluating the seismic performance of different bidirectional COF frames in a strong earthquake and stress conditions of the members.

By explaining the disclosed embodiments, those skilled in the art can implement or use the present invention. Various modifications to the embodiments are readily apparent to professionals skilled in the art, and the general principles defined herein may be implemented in other embodiments without departing from the spirit or scope of the present invention. Therefore, the present invention is not limited to these embodiment disclosed herein but is in accordance with the widest scope consistent with principle and novel features of the present invention.

What is claimed is:

1. A method for designing a strong column and weak beam of a steel frame beam-box column under bidirectional earthquake actions, comprising:
   S1: designing an initial frame;
   S2: defining important beam-column joints and important sections at a designed axial compression ratio according to a calculated result of a response spectrum complete quadratic combination (CQC) method of the initial frame, wherein the important beam-column joints are joints with the designed axial compression ratio not meeting checking calculation of a strong column and weak beam in a current code after calculation by the response spectrum CQC method of the initial frame, and the important sections are end sections of all upper and lower columns of the important beam-column joints;
   S3: unifying bidirectional column overdesign factor (COF) values of the important beam-column joints by means of fixing thickness of middle columns of the important beam-column joints, increasing beam strength of the important beam-column joints with increase of a story height, and inversely calculating the bidirectional COF value of each joint by virtue of column resistance $\Sigma M_p^c$ and a beam effect $\Sigma M_p^b$, wherein each of story edges, each of corner columns and each of middle columns are kept consistent in section;
   S4: determining a degree to achieve the strong column and weak beam, and proposing two quantifiable evaluation indexes $P_1$ and $P_2$ with reference to performance-based standard grades C and D; and
   S5: performing statistics on a damage index D of the frame after an elastic-plastic time-history analysis of a plurality of groups of natural waves, and acquiring a parameter frame meeting a target yield mechanism via the statistics performed on the damage index D in combination with an evaluation standard; if the parameter frame meets the evaluation standard, considering that the frame is capable of achieving a target strong column and weak beam yield mechanism; and if the parameter frame does not meet the evaluation standard, indicating that the designed frame under the bidirectional earthquake actions is not capable of achieving the strong column and weak beam yield mechanism meeting the evaluation standard, and then returning to S3 and re-designing the frame by enlarging the bidirectional COF values, as to improve an anti-seismic safety and a collapse resistant capacity of a structure.

2. The method for designing the strong column and weak beam of the steel frame beam-box column under bidirectional earthquake actions according to claim 1, wherein in S1, the initial frame is a frame meeting checking calculation in a first stage of a structure in a light earthquake combination.

3. The method for designing the strong column and weak beam of the steel frame beam-box column under bidirectional earthquake actions according to claim 1, wherein in S2, the important beam-column joints are joints with a standard axial compression ratio greater than 0.35 after calculation by the response spectrum CQC method of the initial frame.

4. The method for designing the strong column and weak beam of the steel frame beam-box column under bidirectional earthquake actions according to claim 3, wherein a calculation equation of the standard axial compression ratio $\mu_p$ is as follows:

$$\mu_p = \frac{N}{N_p}$$

wherein N is a column axial pressure in a frequently occurred earthquake combination, and $N_p$ is a yield axial force of a section of the box column at an intersection of spatial beam-column joints.

5. The method for designing a strong column and weak beam of a steel frame beam-box column under bidirectional earthquake actions according to claim 1, wherein in S3, a relational expression between the bidirectional COF values and the column resistance and the beam effect is as follows:

for a uniform beam:

$$\sum \left(1 - \frac{N}{N_p}\right) M_{px} \geq COF \cdot \sqrt{\left(\sum M_{px}^b\right)^2 + \left(\sum M_{py}^b\right)^2}$$

for a beam with a variable section at a flange of an end plate:

$$\sum \left(1 - \frac{N}{N_p}\right) M_{px} \geq COF \cdot \sqrt{\left(\sum (M_{px}^b + M_{vx})\right)^2 + \left(\sum (M_{py}^b + M_{vy})\right)^2}$$

where N is the column axial pressure in the frequently occurred earthquake combination; $N_p$ and $M_{px}$ are respectively the yield axial force of a section of the box column at an intersection of spatial beam-column joints and a full plastic bending moment around a main axis; $M_{px}^b$, $M_{vx}$, $M_{py}^b$ and $M_{vy}$ are respectively full plastic bending moments of steel beams in x and y planes at the intersection of spatial beam-column joints and additional bending moments generated by transferring plastic hinges; COF is a bidirectional strong column coefficient corresponding to a bidirectional equation, and in the above two equations, the left equation is defined as the column resistance $\Sigma M_p^c$ and the right equation is defined as the beam effect $\Sigma M_p^b$.

6. The method for designing the strong column and weak beam of the steel frame beam-box column under bidirectional earthquake actions according to claim 5, wherein a unidirectional bending full plastic strength $M_{px}$ around the main axis is taken in the designed axial compression ratio or the standard axial compression ratio as a conservative value, and based on that the column is subjected to the full plastic strength of an orthogonal beam simultaneously, square root of the sum of the square of the full plastic strength around the main axis is taken as the beam effect in the bidirectional equation.

7. The method for designing the strong column and weak beam of the steel frame beam-box column under bidirectional earthquake actions according to claim 1, wherein in S4, the performance-based standard grades C and D are grades C and D correspondingly required in Standard for Performance-based Seismic Design of Building Structures published in 2022, and the grades C and D are defined as the strong column and weak beam;

equations for the evaluation indexes $P_1$ and $P_2$ are as follows:

for the strong column and weak beam at the grade C:

$$\begin{cases} P_1^C = \max\left\{\frac{L4\%}{30\%}, \frac{L5\% + L6\%}{5\%}\right\} \leq 1 \\ P_2^C = \frac{L4\%}{30\%} + \frac{L5\% + L6\%}{5\%} \leq 1 \end{cases}$$

for the strong column and weak beam at the grade D:

$$\begin{cases} P_1^D = \max\left\{\frac{L5\%}{30\%}, \frac{L6\%}{5\%}\right\} \leq 1 \\ P_2^D = \frac{L5\%}{30\%} + \frac{L6\%}{5\%} \leq 1 \end{cases}$$

wherein L4%, L5% and L6% are respectively proportions of damage grades being L4, L5 and L6 in the important sections; $P_1^C$ and $P_2^C$ respectively represent that the important sections need to meet the following conditions: 1) the proportion with the damage grade L4 does not exceed 30%; and 2) the proportions with the damage grade L5 and above do not exceed 5%; and $P_1^D$ and $P_2^D$ respectively represent that the important sections need to meet the following conditions: 1) the proportion with the damage grade L5 does not exceed 30%; and 2) the proportion with the damage grade L6 does not exceed 5%.

8. The method for designing a strong column and weak beam of a steel frame beam-box column under bidirectional earthquake actions according to claim 7, wherein in S4, by taking the degree of strong column and weak beam achieving the grade D as an example, the situation that a mean value of $P_1^D$ or $P_2^D$ of the frame under the plurality of groups of natural waves plus one time standard deviation (μ+σ) is not greater than 1, represents that the frame has an enough probability to achieve the strong column and weak beam yield mechanism at the grade D; the situation that only the mean value (μ) is not greater than 1, represents that the frame can achieve the strong column and weak beam yield mechanism at the grade D in an average sense; and the situation that statistical values of the evaluation indexes all are greater than 1, represents that the frame does not meet the requirements of the strong column and weak beam.

9. The method for designing a strong column and weak beam of a steel frame beam-box column under bidirectional earthquake actions according to claim 1, wherein in S5, the damage index D is a ratio of the maximum (pressure) strain $\varepsilon_{max}$ to yield strain $\varepsilon_y$ of all important sections in the seismic time-history analysis, with an equation as follows:

$$D = \frac{\varepsilon_{max}}{\varepsilon_y}.$$

10. The method for designing a strong column and weak beam of a steel frame beam-box column under bidirectional earthquake actions according to claim 1, wherein applications of the method for designing a strong column and weak beam of a steel frame beam-box column under bidirectional earthquake actions need to meet the following requirements: 1) the design method is suitable for a condition that the designed axial compression ratio of the frame in the frequently occurred earthquake combination is 0.4-0.6, and a corresponding standard axial compression ratio is 0.35-0.55; 2) an extrusion effect of a floorslab on a frame column is neglected; 3) random factors such as superstrong steel and a dimensional deviation of an actual beam-column member are neglected; 4) each of the story edges and corner columns are consistent with the middle columns in the parameter frame; and 5) it is considered that variables of each frame merely lies in a strict degree to control the strong column and weak beam, and an appropriate degree of the bidirectional COF value is capable of being evaluated by evaluating the seismic performance of different bidirectional COF frames and stress conditions of the members in a strong earthquake.

* * * * *